(12) United States Patent
Kobayashi et al.

(10) Patent No.: US 8,960,390 B2
(45) Date of Patent: Feb. 24, 2015

(54) VEHICLE-MOUNTED ACTIVE VIBRATION REDUCING DEVICE

(75) Inventors: Yasunori Kobayashi, Utsunomiya (JP); Toshio Inoue, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 163 days.

(21) Appl. No.: 13/145,064

(22) PCT Filed: Jan. 18, 2010

(86) PCT No.: PCT/JP2010/050503
§ 371 (c)(1),
(2), (4) Date: Jul. 18, 2011

(87) PCT Pub. No.: WO2010/084842
PCT Pub. Date: Jul. 29, 2010

(65) Prior Publication Data
US 2011/0272229 A1   Nov. 10, 2011

(30) Foreign Application Priority Data

Jan. 20, 2009   (JP) ................................. 2009-010014

(51) Int. Cl.
*F16F 7/10* (2006.01)
*F16F 15/04* (2006.01)
*F16F 15/00* (2006.01)

(52) U.S. Cl.
CPC .............. *F16F 7/1011* (2013.01); *F16F 15/04* (2013.01); *F16F 15/002* (2013.01)
USPC ....... 188/379; 267/136; 267/140.15; 188/378

(58) Field of Classification Search
CPC ........... F16F 7/00; F16F 15/00; F16F 15/002; F16F 15/02; F16F 15/021; F16F 15/04; F16F 7/10; F16F 7/104

USPC ............. 188/378–380; 267/136, 292, 140.11, 267/140.15, 140.4, 140.5, 141, 141.1; 248/560, 562, 636, 638
See application file for complete search history.

(56) References Cited

U.S. PATENT DOCUMENTS 989,958 A * 4/1911 Frahm ........................... 188/380
5,595,430 A * 1/1997 Weyeneth ................... 312/319.1
(Continued)

FOREIGN PATENT DOCUMENTS

| EP | 1498613 A2 * | 1/2005 |
| JP | 05-069853 A | 3/1993 |
| JP | 05-026745 U | 4/1993 |

(Continued)

*Primary Examiner* — Melody Burch
(74) *Attorney, Agent, or Firm* — Carrier Blackman & Associates, P.C.; William D. Blackman; Michael J. McCandlish

(57) ABSTRACT

Provided is a vehicle-mounted active vibration reducing device wherein vibrations in a plurality of directions are reduced by a single dynamic damper. Since an actuator is attached so as to be supported by an elastic member attached to a bracket, the actuator can be used as a mass of a dynamic damper. The moving directions of the actuator are the forward and rearward directions, and are different from the moving directions of the dynamic damper using the actuator as a mass, i.e., the upward and downward directions. Accordingly, vibrations can be controlled in the forward and rearward directions which correspond to the moving directions of the actuator as well as the upward and downward directions which correspond to the moving directions of the dynamic damper.

8 Claims, 9 Drawing Sheets

(56) References Cited

U.S. PATENT DOCUMENTS

| | | | | |
|---|---|---|---|---|
| 5,734,595 | A * | 3/1998 | Matsuno | 701/104 |
| 7,079,380 | B2 * | 7/2006 | Wubs | 361/679.35 |
| 7,255,335 | B2 * | 8/2007 | Muraoka et al. | 267/140.14 |
| 7,856,916 | B2 * | 12/2010 | Anderson | 89/44.02 |
| 2005/0248070 | A1 * | 11/2005 | Ichikawa et al. | 267/136 |

FOREIGN PATENT DOCUMENTS

| | | | |
|---|---|---|---|
| JP | 7186805 A | * | 7/1995 |
| JP | 10-103406 A | | 4/1998 |
| JP | 11-094015 A | | 4/1999 |
| JP | 2001-227582 A | | 8/2001 |
| JP | 2006-298353 A | | 11/2006 |

* cited by examiner

FIG. 8

VEHICLE-MOUNTED ACTIVE VIBRATION REDUCING DEVICE

TECHNICAL FIELD

The present invention relates to a vehicle-mounted active vibration reducing apparatus (device) for reducing vibrations in a plurality of directions of a target object, which is controlled to attenuate vibrations.

BACKGROUND ART

Heretofore, there have been employed dynamic dampers as vibration reducing apparatuses (vibration attenuators), as disclosed in Japanese Laid-Open Utility Model Publication No. 05-026745 and Japanese Laid-Open Patent Publication No. 2001-227582.

Japanese Laid-Open Utility Model Publication No. 05-026745 reveals a vehicular auxiliary supporting apparatus, wherein an engine auxiliary such as an alternator or the like is disposed in a position aligned with a vibrational antinode of a subframe. In operation, the engine auxiliary oscillates in order to cancel out vibrations of the subframe, and hence the engine auxiliary acts as a dynamic damper.

Japanese Laid-Open Patent Publication No. 2001-227582 discloses a dynamic damper including a mass mounted on a rectangular arm of a subframe by an elastic rubber body (this assembly will hereinafter be referred to as an "elastic mass and rubber assembly"). The elastic mass and rubber assembly is set to a resonant frequency that matches the resonant frequency of the subframe. At times when the engine is in operation, when engine vibrations are applied to the subframe, thereby causing the subframe to resonate, the elastic mass and rubber assembly resonates in order to suppress resonant vibrations of the subframe.

Japanese Laid-Open Patent Publication No. 05-069853 discloses a vehicle-mounted active vibration reducing apparatus for an elongate subframe, opposite ends of which are coupled to a vehicle body by respective dampers. The vehicle-mounted active vibration reducing apparatus includes a piezo actuator connected in parallel to the damper at one end of the elongate subframe. In operation, the piezo actuator is operated in opposite phase with vibrations that occur at the other end of the subframe, thereby reducing vibrations of the subframe.

SUMMARY OF THE INVENTION

A general dynamic damper includes a bracket mounted on a vibrating target object, which is controlled in order to attenuate vibrations, an elastic member mounted on the target object, and a mass swingably supported on the elastic member. The dynamic damper functions to attenuate only a vibratory component at a resonant frequency along the direction in which the mass operates. In other words, the direction in which the mass operates must agree with the direction in which vibrations are attenuated.

If the target object has vibratory components in a plurality of directions, then it is necessary to install a dynamic damper for each of such directions. If the target object has a plurality of resonant frequencies, then it is necessary to install a dynamic damper for each of such resonant frequencies.

However, a dynamic damper for use on vehicles weighs several kilograms [kg] per unit. If plural dynamic dampers are installed on a vehicle (target object), then a very high installation cost is incurred. Further, the dampers suffer significant limitations on their installation space, and lead to poor fuel economy.

Similarly, if piezo actuators are installed parallel to the dampers, then such piezo actuators require a large installation space. Further, such piezo actuators suffer large limitations on their installation space, incur a very high installation cost, and result in increased weight.

The present invention has been made in view of the above-noted drawbacks. It is an object of the present invention to provide a vehicle-mounted active vibration reducing apparatus, which reduces installation costs, reduces limitations on the installation space thereof, and achieves increased fuel economy by way of a reduction in weight.

Another object of the present invention is to provide a vehicle-mounted active vibration reducing apparatus, which includes a single dynamic damper that is capable of reducing vibrations in a plurality of directions.

Still another object of the present invention is to provide a vehicle-mounted active vibration reducing apparatus, which includes a single dynamic damper that is capable of reducing vibrations within a wide frequency range in at least one of a plurality of vibration reducing directions.

A vehicle-mounted active vibration reducing apparatus according to the present invention includes a dynamic damper having a bracket mounted on a target object, which vibrates in a plurality of directions, an elastic member mounted on the bracket, and an actuator supported by the elastic member, and a controller for operating the actuator based on a signal, which is correlated to vibrations of the target object. The actuator has operating directions, which are different from operating directions of the dynamic damper.

According to the present invention, since the actuator is supported by the elastic member that is mounted on the bracket, the actuator can be used as a mass of a general nature for the dynamic damper. Furthermore, since the operating directions of the actuator differ from the operating directions of the dynamic damper, which includes the actuator as the mass thereof, vibrations can be attenuated in operating directions of the dynamic damper, and also in operating directions of the actuator, which differ from the operating directions of the dynamic damper.

The actuator is fixed in position by the elastic member in the operating directions of the actuator, and is supported by the elastic member so as to be swingable in the operating directions of the dynamic damper. With such an arrangement, forces applied in the operating directions of the actuator are not absorbed by the elastic member, but rather, act directly on the target object through the elastic member and the bracket.

According to the present invention, vibrations can be attenuated in operating directions of the dynamic damper, which includes the actuator as the mass thereof, and also in operating directions of the actuator, which differ from the operating directions of the dynamic damper.

According to the present invention, therefore, the vehicle-mounted active vibration reducing apparatus, which includes a single dynamic damper, is capable of reducing vibrations in a plurality of directions. As a consequence, installation costs for the dynamic damper, as well as limitations imposed on the installation space, are reduced. Further, increased fuel economy is achieved by way of a reduction in weight.

BRIEF DESCRIPTION OF THE DRAWINGS

FIG. 8 is a schematic view of a vehicle, which incorporates therein a vehicle-mounted active vibration reducing apparatus according to a second embodiment of the present invention.

DESCRIPTION OF THE EMBODIMENTS

Embodiments of the present invention will be described below with reference to the drawings.

Figure 1:
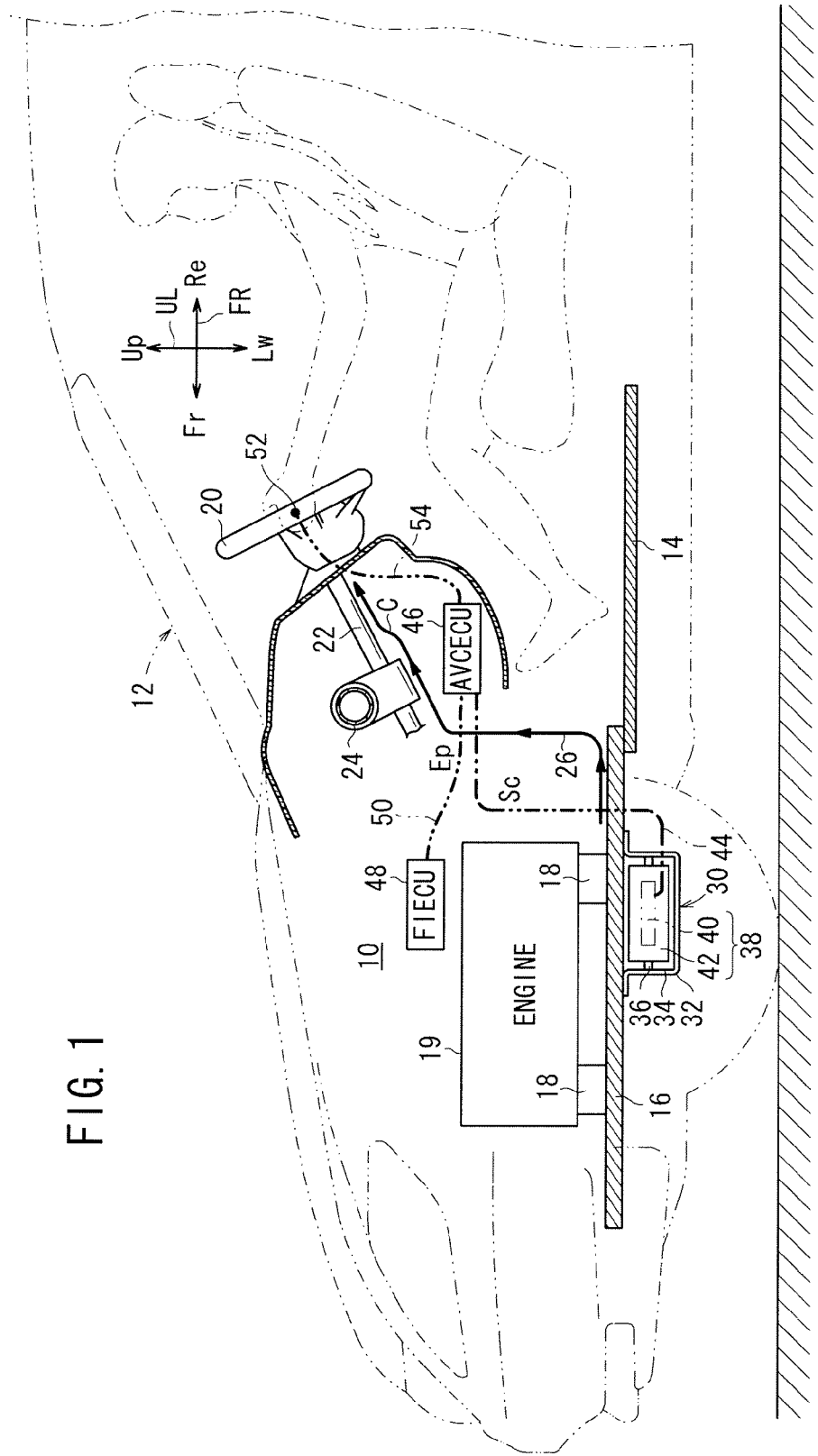
FIG. 1 is a schematic view of a vehicle, which incorporates therein a vehicle-mounted active vibration reducing apparatus according to a first embodiment of the present invention.

A. First Embodiment:

FIG. 1 schematically shows an arrangement of a vehicle 12 incorporating a vehicle-mounted active vibration reducing apparatus (hereinafter referred to as an "AVC apparatus (active vibration control apparatus)") 10 according to a first embodiment of the present invention.

The vehicle 12 has a floor panel 14 and a subframe 16, which is mounted on a front portion of the floor panel 14 and serves as a vibration source proximity member, and a target object (first target object), which is controlled to attenuate vibrations thereof.

An engine 19 (internal combustion engine), which acts as a vibration source, is mounted on the subframe 16 through vibration attenuating rubber members 18.

A steering wheel 20, which serves as another target object (second target object) controlled to attenuate vibrations thereof, is supported on a steering shaft 22, which is rotatably supported by a steering hanger 24.

The steering hanger 24 is fixed, for example, to opposite front side panels, not shown. The front side panels are coupled to the floor panel 14 and the subframe 16.

Vibrations of the engine 19 are transmitted from the engine 19 through the vibration attenuating rubber members 18 to the steering wheel 20 via a transmission route 26, which is indicated by the arrow "C", i.e., a transmission route 26 from the subframe 16 (the floor panel 14), to the front side panels, to the steering hanger 24, and to the steering shaft 22.

A dynamic damper 30 for attenuating vibrations of the subframe 16 is mounted on a lower side of the subframe 16.

The transmission route 26 from the dynamic damper 30 to the steering wheel 20 has a transfer function (phase and amplitude characteristics) represented by "C". The transfer function C can be determined by way of measurement or simulation. Such a transfer function, which is determined by way of measurement or simulation, is referred to as a "simulated transfer function $\hat{C}$" or as a "simulated transfer function $C\hat{\;}$".

Figure 2:
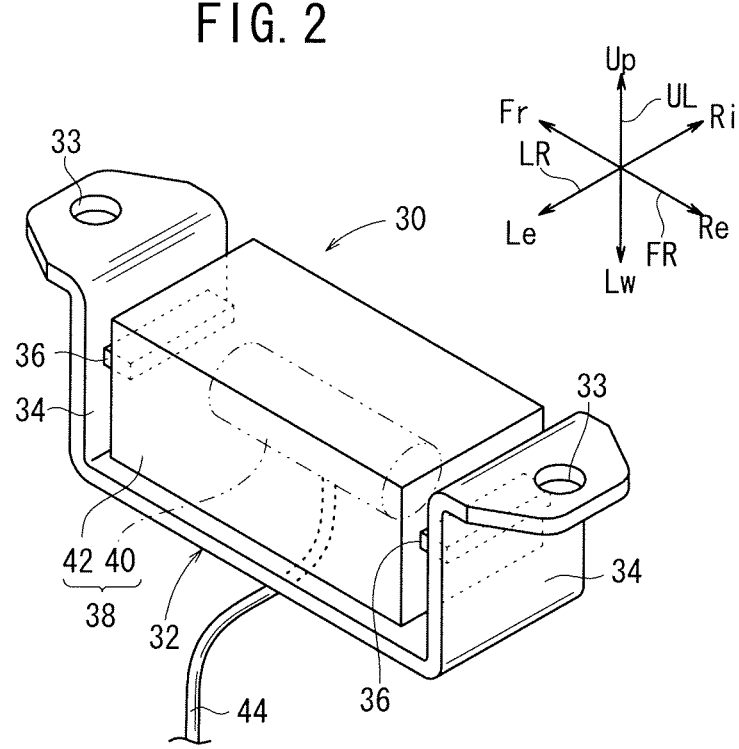
FIG. 2 is a perspective view of a dynamic damper, as an example of the vehicle-mounted active vibration reducing apparatus according to the first embodiment.

As also shown in FIG. 2, the dynamic damper 30 includes a steel bracket 32, which is C-shaped, for example, and is mounted on a lower side of the subframe 16 by bolts (not shown) inserted through holes 33 defined in respective tongues, two elastic members 36 made of hard rubber each in the form of a flat rectangular parallelepiped, which are mounted respectively on opposite sides 34 of the bracket 32, and a mass-combined actuator 38 suspended between the two elastic members 36 and swingably supported thereby for swinging movement in vertical directions UL, i.e., in an upward direction Up and a downward direction Lw.

Figure 3:
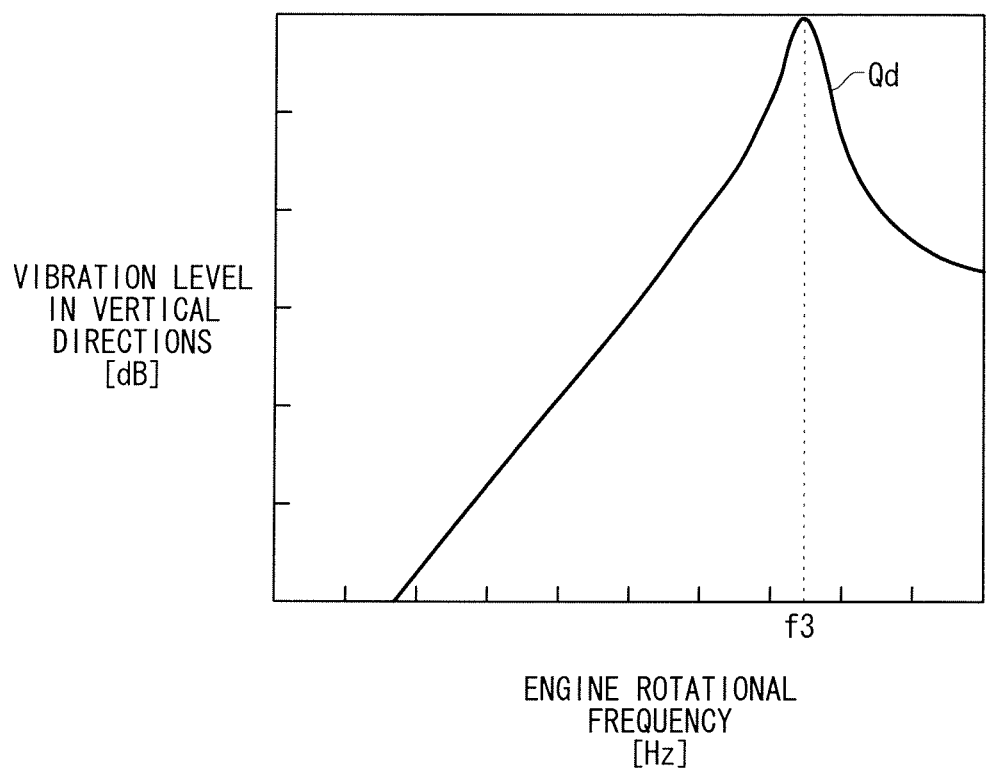
FIG. 3 is a diagram showing resonant characteristics of an actuator, which functions as a mass of the dynamic damper.

In the vertical directions UL, the elastic members 36 are formed to be thinner. Therefore, the actuator 38, which functions as a mass of the dynamic damper 30, is capable of swinging (vibrating) in vertical directions UL, i.e., such vertical directions UL act as operating directions (vibration controlling directions), and has a prescribed vibratory characteristic Qd (resonant frequency f3; see FIG. 3). In FIG. 3, the horizontal axis represents the engine rotational frequency [Hz], and the vertical axis represents the vibration level [dB].

The actuator 38 comprises an actuator unit 40, such as a reciprocating motor, a piezo actuator, a voice-coil actuator, a linear solenoid, or the like, and a hard rubber block 42 with the actuator unit 40 molded therein. The sum of the weight of the hard rubber block 42 and the weight of the actuator unit 40, i.e., the weight of the actuator 38, functions as the mass of the dynamic damper 30.

As described above, the actuator 38, which functions as the mass of the dynamic damper 30, has a resonant frequency f3 in the vertical directions UL. The dynamic damper 30 acts to attenuate vibrations in vertical directions at the resonant frequency f3 of the subframe 16 on which the bracket 32 of the dynamic damper 30 is mounted.

Due to vibrations of the subframe 16, which are based on the vibrations of the engine 19, the steering wheel 20 vibrates in vertical directions UL at the same frequency f3 as the resonant frequency f3. Therefore, because the dynamic damper 30 acts to attenuate vibrations in the vertical directions UL of the subframe 16, unwanted vibrations in vertical directions UL of the steering wheel 20 at the frequency f3 are also attenuated.

In addition to vibrating in vertical directions UL, the steering wheel 20 is easily vibrated in forward and rearward directions FR, i.e., in a forward direction Fr and a rearward direction Re.

Figure 4:
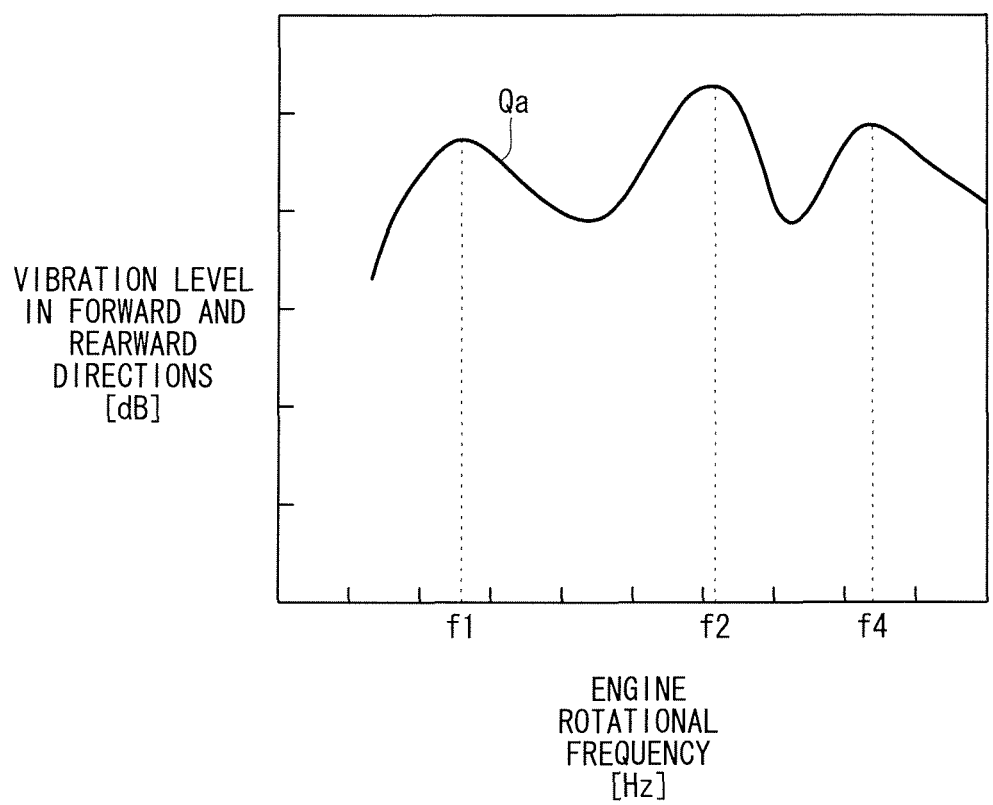
FIG. 4 is a diagram showing vibratory characteristics in forward and rearward directions of a subframe.

FIG. 4 shows vibratory characteristics in forward and rearward directions FR of the subframe 16. The steering wheel 20, which is structurally coupled to the subframe 16, also vibrates at a plurality of frequencies f1, f2 and f4 in forward and rearward directions FR of the subframe 16.

A mechanism is required to attenuate unwanted frequencies in forward and rearward directions FR of the subframe 16 and the steering wheel 20 at the frequencies f1, f2 and f4.

To meet such a requirement, the actuator unit 40 is disposed in the actuator 38 in order to generate forces, i.e., to have operating directions (vibration controlling directions) in forward and rearward directions FR. Forces generated by the actuator unit 40 in forward and rearward directions FR are applied through the hard rubber block 42, which functions as a molding member of the actuator 38, to surfaces of the elastic member 36, which are spaced along the forward and rearward directions FR.

More specifically, the elastic members 36 are inserted and secured respectively between one side 34 of the bracket 32 and the front surface of the actuator 38, as well as between the other side 34 of the bracket 32 and the rear surface of the actuator 38. The actuator 38 is fixed in position with respect to forward and rearward directions FR, i.e., with respect to the operating directions, by the elastic members 36. When the actuator unit 40 operates in forward and rearward directions FR, forces generated as stresses by the actuator 38 in forward and rearward directions FR are applied through the elastic members 36 and the bracket 32 to the subframe 16. In this manner, stresses generated by the actuator unit 40, i.e., stresses generated by the actuator 38, are transmitted directly to the subframe 16 through the elastic members 36 and the bracket 32.

In order to enable the actuator 38 to generate forces in forward and rearward directions FR at frequencies f1, f2 and f4, as shown in FIG. 1, a cable 44 for supplying electric control signals Sc has one end connected to the actuator unit 40, which extends from the actuator 38, and another end connected to an active vibration controller (referred to as an "AVCECU") 46.

The AVCECU 46 is fixed at an appropriate position within the dashboard. The engine 19 is housed in a vehicle compartment (engine compartment), and a fuel injection controller (referred to as an "FIECU") 48 is installed at an appropriate position. The FIECU 48 and the AVCECU 46 are connected to each other by a cable 50.

The AVCECU 46 is connected by a cable 54 to a vibration sensor 52, which is embedded in a central portion of the steering wheel 20, for detecting vibrations of the steering wheel 20.

Figure 5:
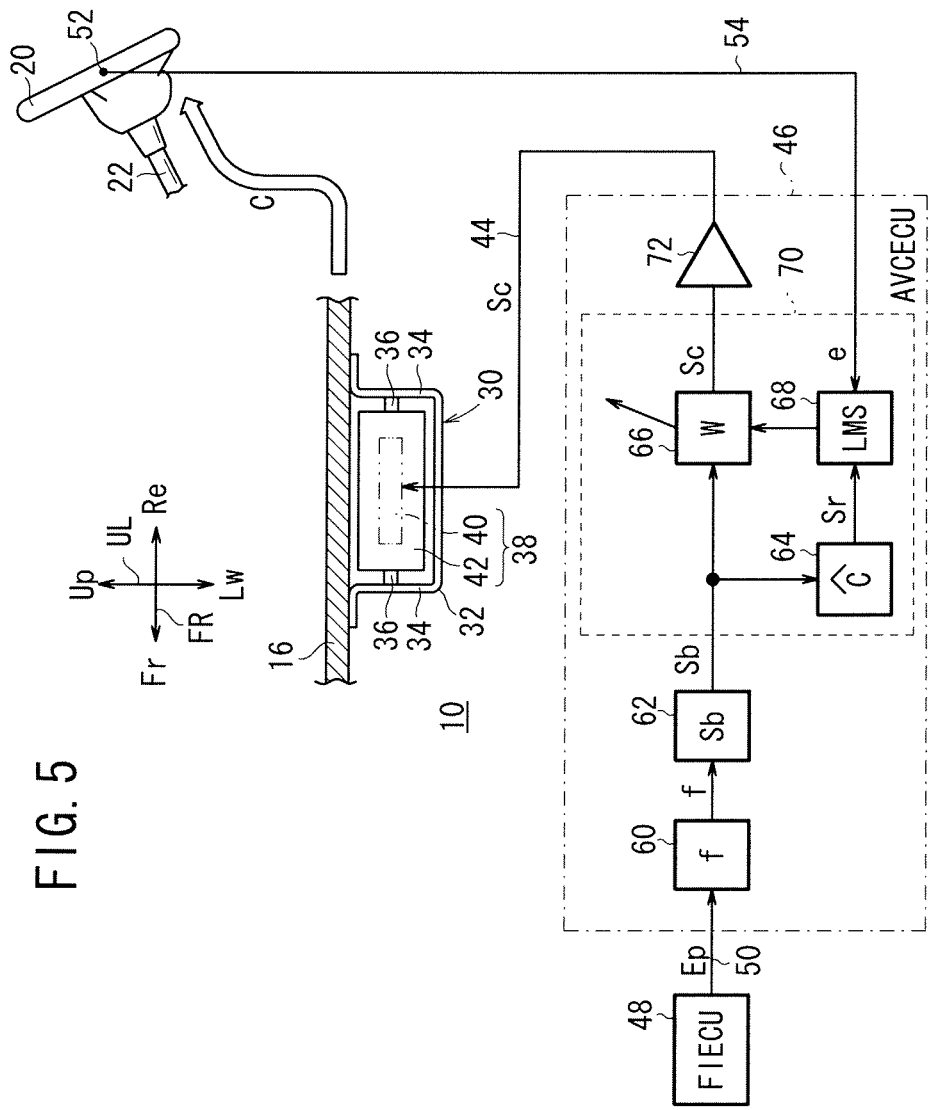
FIG. 5 is a block diagram of the vehicle-mounted active vibration reducing apparatus according to the first embodiment.

FIG. 5 shows a configuration of the AVC apparatus 10. In the AVC apparatus 10, the AVCECU 46 is supplied via the cable 50 with engine pulses Ep from the FIECU 48. Each engine pulse Ep goes high in level when a piston of the engine 19 reaches a top dead center position. If the engine 19 is a four-cylinder engine, then the engine pulse Ep goes high in level each time that the crankshaft, not shown, makes a one-half)(180° revolution.

The vibration sensor 52 supplies an error signal e representative of vibrations of the steering wheel 20 via the cable 54 to the AVCECU 46.

Each of the FIECU 48 and the AVCECU 46 comprises hardware components including a microcomputer, a memory, an input and output circuit, etc.

The AVCECU 46 generates a control signal Sc based on the engine pulses Ep from the FIECU 48 and the error signal e from the vibration sensor 52. The AVCECU 46 then amplifies the control signal Sc with an amplifier 72, and outputs the amplified control signal Sc to the actuator unit 40, which operates the actuator 38 in forward and rearward directions FR.

A frequency detector 60 detects an engine rotational frequency f [Hz] from the engine pulses Ep, and outputs the detected engine rotational frequency f.

A standard signal generator 62 generates a standard signal Sb having a frequency that is a harmonic of the engine rotational frequency f. Actually, the standard signal Sb includes a sine-wave signal and a cosine-wave signal, which are supplied in parallel to a control signal generator 70.

The control signal generator 70 performs an adaptive filtering process on the standard signal Sb in order to generate a control signal Sc. The control signal generator 70 includes an adaptive filter 66, a reference signal generator 64, and a filter coefficient updater 68.

The reference signal generator 64 performs a transfer function process on the standard signal Sb, which is output from the standard signal generator 62, in order to generate a reference signal Sr (also referred to as a "filter standard signal"), and outputs the reference signal Sr to the filter coefficient updater 68. The reference signal generator 64 has a simulated transfer function $\hat{C}$ set therein, which is simulative of the transfer function (phase and amplitude characteristics) C of the transmission route 26.

The adaptive filter 66 comprises a notch filter, for example, which performs an adaptive filtering process on the standard signal Sb using a filter coefficient W, so as to generate a control signal Sc for generating vibrations that cancel out unwanted vibrations in forward and rearward directions FR at frequencies f1, f2 and f4. The control signal Sc is amplified by the amplifier 72, and then supplied as an amplified control signal Sc to the actuator unit 40.

The filter coefficient updater 68 sequentially calculates and updates a filter coefficient W of the adaptive filter 66. The filter coefficient updater 68 calculates the filter coefficient W according to an adaptive algorithm, e.g., a least-mean-square (LMS) algorithm. More specifically, based on the reference signal Sr from the reference signal generator 64 and the error signal e from the vibration sensor 52, the filter coefficient updater 68 calculates the filter coefficient W so as to eliminate the square $e^2$ of the error signal e.

The AVC apparatus 10, which is constructed in the foregoing manner (i.e., which corresponds to a mechanism for attenuating unwanted vibrations in forward and rearward directions FR) is capable of reducing vibrations in forward and rearward directions FR within a wide-band frequency range (wide frequency range) corresponding to frequencies f1, f2 and f4, which are harmonics of the engine rotational frequency f shown in FIG. 4.

Figure 6:
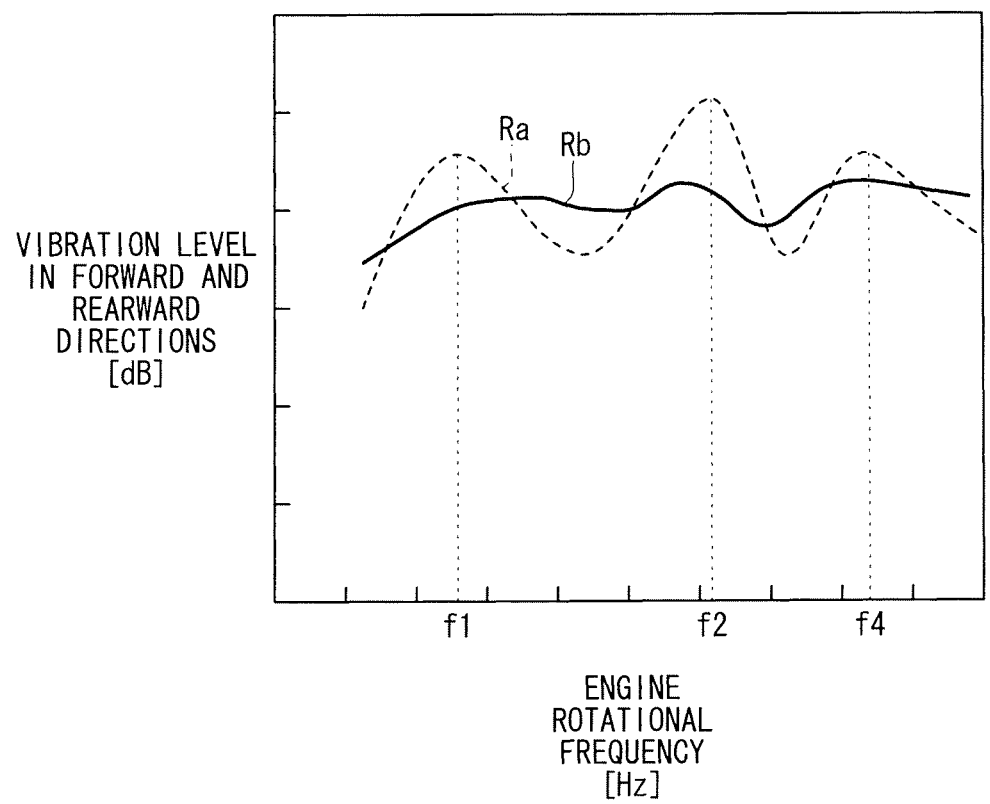
FIG. 6 is a diagram showing vibratory characteristics in forward and rearward directions of the subframe, in cases where control of the vehicle-mounted active vibration reducing apparatus is turned on and off.

FIG. 6 shows vibratory characteristics in forward and rearward directions FR of the subframe 16, in cases where control of the AVC apparatus 10 is turned on and off. The characteristic curve Ra indicated by the dotted line represents characteristics before vibrations are attenuated in the case where control is turned off, whereas the characteristic curve Rb indicated by the solid line represents characteristics at a time when vibrations are attenuated (vibrations are reduced) in the case where control is turned on.

As described above, since the dynamic damper 30 includes the prescribed resonant characteristic Qd, at the resonant frequency f3 shown in FIG. 3, the dynamic damper 30 is capable of reducing vibrations in vertical directions UL at the resonant frequency f3.

Figure 7:
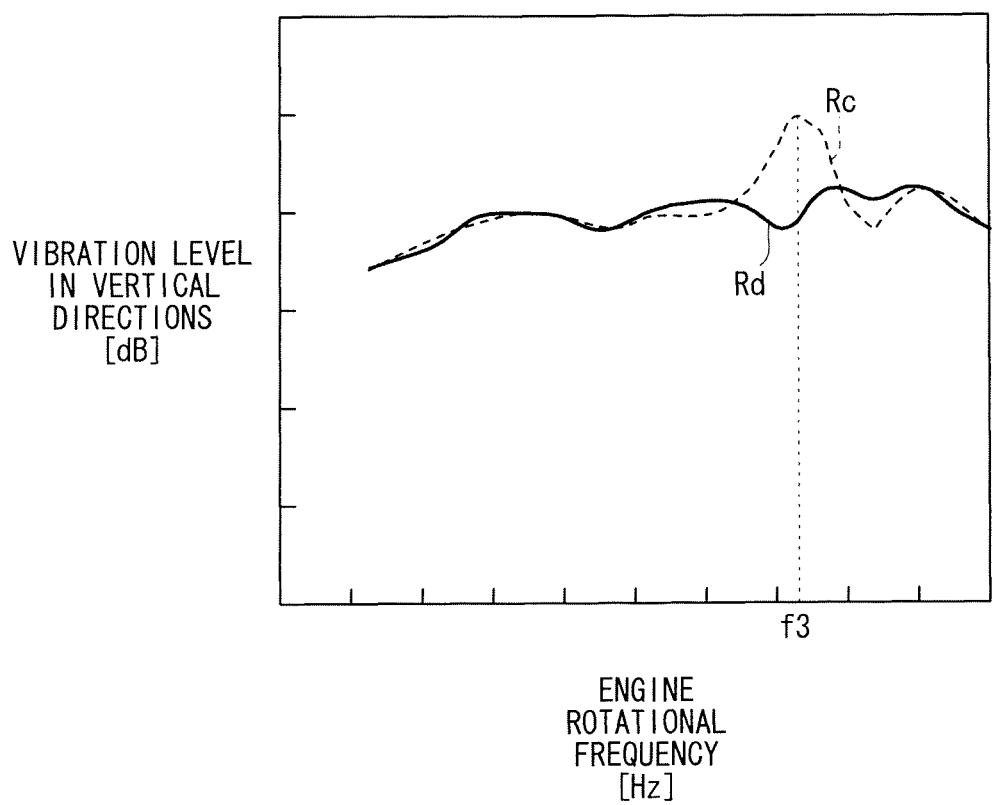
FIG. 7 is a diagram showing vibratory characteristics in a vertical direction of the subframe in cases where the dynamic damper is installed and not installed.

FIG. 7 shows characteristics of vibration levels in vertical directions RL of the subframe 16, in respective cases where the dynamic damper 30 is installed and not installed. The characteristic curve Rc indicated by the dotted line represents characteristics in the case where the dynamic damper 30 is not installed on the subframe 16 (without the dynamic damper 30), whereas the characteristic curve Rd indicated by the solid line represents characteristics in the case where the dynamic damper 30 is installed on the subframe 16 (i.e., in the case where the subframe 16 is provided with the dynamic damper 30).

According to the first embodiment, therefore, the AVC apparatus 10 including the single dynamic damper 30 is capable of attenuating vibrations in both forward and rearward directions FR and vertical directions UL, in a wide frequency range including the frequencies f1 through f4. The actuator 38 and the dynamic damper 30, when operated, are capable of reducing vibrations in a plurality of directions, i.e., vertical directions UL and forward and rearward directions FR, of the subframe 16 and the steering wheel 20.

B. Second Embodiment

Figure 8:
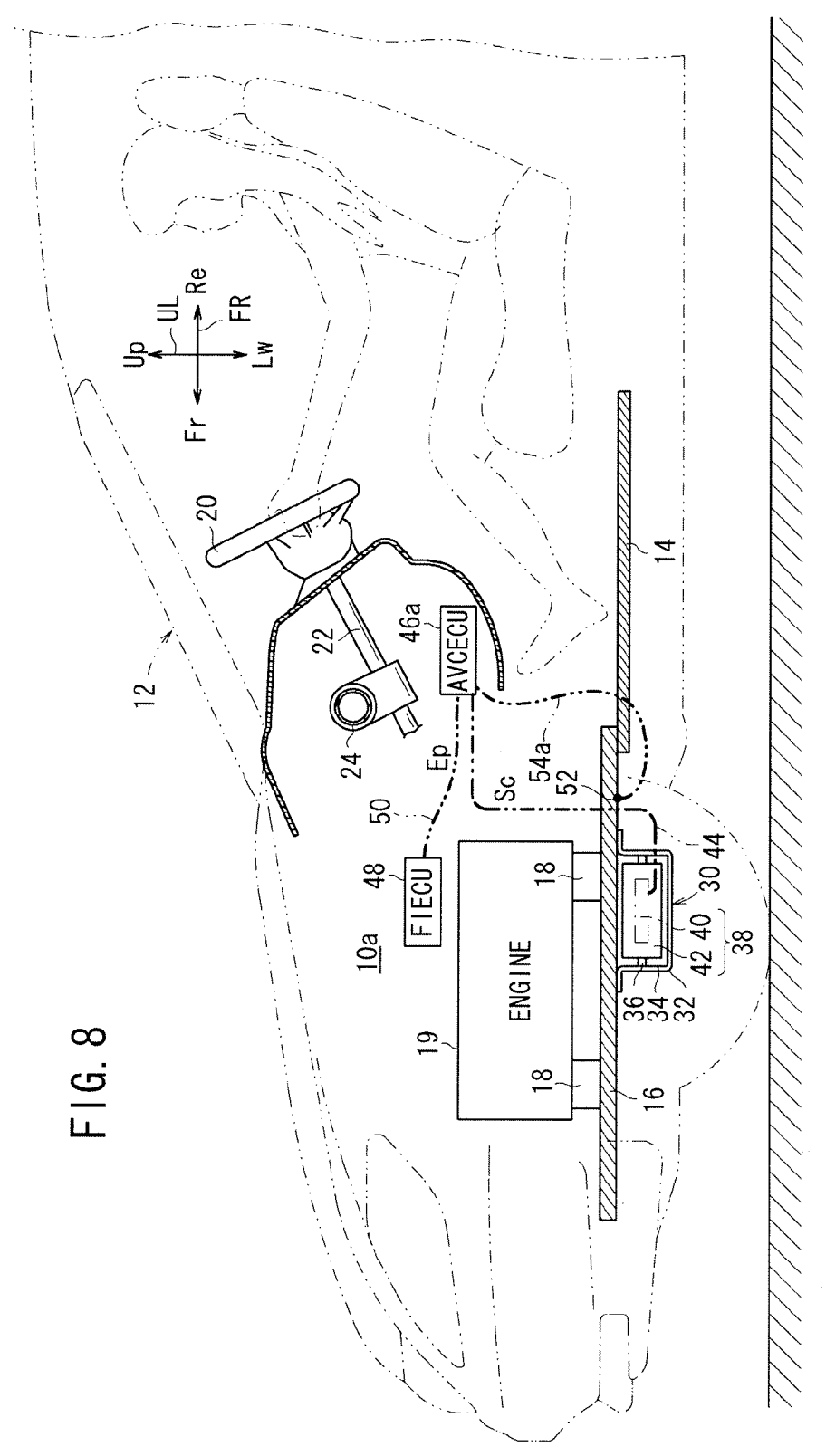
Figure 9:
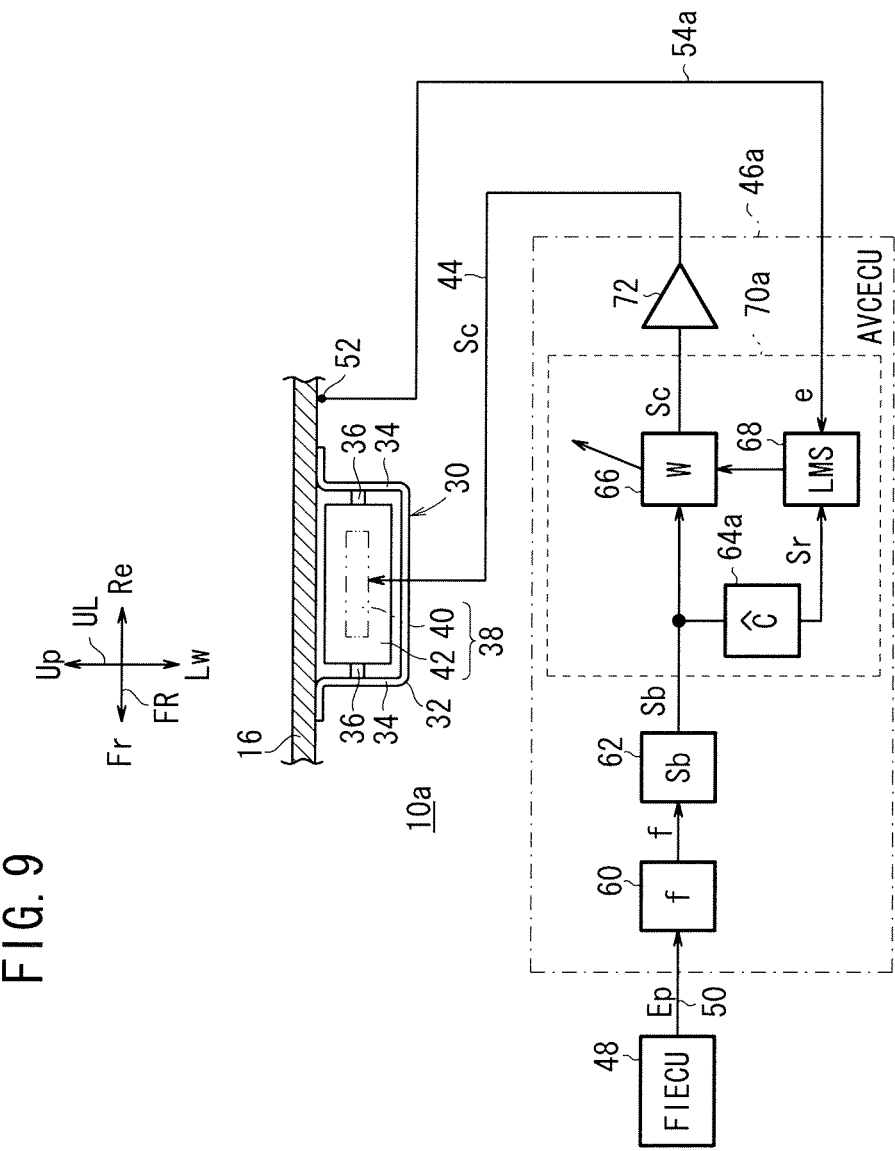
FIG. 9 is a block diagram of the vehicle-mounted active vibration reducing apparatus according to the second embodiment.

FIGS. 8 and 9 show an AVC apparatus 10a according to a second embodiment of the present invention. In the AVC apparatus 10a, the bracket 32 of the dynamic damper 30 and the vibration sensor 52 are mounted on the subframe 16, such that the actuator 38 and the vibration sensor 52 are disposed in proximity to each other.

The AVC apparatus 10a, which is constructed as shown in FIGS. 8 and 9, has increased control stability, because the simulated transfer function Ĉ of a reference signal generator 64a of a control signal generator 70a is close to the value "1", resulting in a minimum-phase system.

According to the second embodiment, the dynamic damper 30 is capable of attenuating vibrations in vertical directions UL of the subframe 16 at the resonant frequency f3, whereas the AVC apparatus 10a is capable of attenuating vibrations in forward and rearward directions FR at frequencies f1, f2 and f4.

The present invention may be applied to the subframe 16, as well as to attenuation of vibrations of other parts and apparatuses utilized in vehicles, e.g., an air compressor.

As described above, the vehicle-mounted active vibration reducing apparatuses 10, 10a according to the first and second embodiments include the dynamic damper 30 having the bracket 32, which is mounted on the subframe 16 as a target object, and which vibrates in a plurality of directions (vertical directions UL, and forward and rearward directions FR), the elastic members 36 mounted on the bracket 32, and the actuator 38 supported by the elastic members 36, and the AVC ECU 46, 46a, which serves as a controller for operating the actuator 38 based on engine pulses Ep as a signal correlated to vibrations of the subframe 16 as the target object. Operating directions (vibration attenuating directions) of the actuator 38 along forward and rearward directions FR differ from the vertical directions UL, which serve as operating directions (vibration attenuating directions) of the dynamic damper 30.

Since the actuator 38 is supported by the elastic members 36 mounted on the bracket 32, the actuator 38 can function as the mass of the dynamic damper 30. In addition, since operating directions of the actuator 38 along forward and rearward directions FR differ from the vertical directions UL, which serve as operating directions of the dynamic damper 30, the single dynamic damper 30, which is combined with the actuator 38, is capable of attenuating vibrations of the subframe 16 and the steering wheel 20 in vertical directions UL, which serve as operating directions of the dynamic damper 30, and at the same time, the single dynamic damper 30 is capable of attenuating vibrations of the subframe 16 and the steering wheel 20 also in forward and rearward directions FR, as operating directions of the actuator 38 that differ from operating directions of the dynamic damper 30.

Consequently, vibrations in a plurality of directions (in the present embodiments, vertical directions UL and forward and rearward directions FR) can be reduced by a single dynamic damper. As a result, the cost required to install the dynamic damper 30 on the vehicle is reduced, limitations imposed on the installation space are reduced, and an increase in fuel economy due to a reduction in weight can simultaneously be achieved.

Inasmuch as the actuator 38 is fixed in position by the elastic members 36 in forward and rearward directions FR, which serve as operating directions of the actuator 38, and because the actuator 38 is supported by the elastic members 36 so as to be swingable in vertical directions UL, which serve as operating directions of the dynamic damper 30, forces applied in forward and rearward directions FR, which serve as operating directions of the actuator 38, are not absorbed by the elastic members 36, but rather, directly act on the subframe 16 as the target object through the elastic members 36 and the bracket 32.

The present invention is not limited to the above embodiments, but various arrangements may be adopted based on details of the present description. For example, a new actuator unit may be embedded in the hard rubber block 42 along leftward and rightward directions LR in order to reduce vibrations (vibrations at one or more resonant frequencies) in leftward and rightward directions LR (or if necessary, in other desired directions).

The invention claimed is:

1. A vehicle-mounted active vibration reducing apparatus comprising:
a dynamic damper including a bracket mounted on a first target object, said dynamic damper capable of vibrating in a plurality of directions, a plurality of elastic members mounted on the bracket, and an actuator operatively supported by the elastic members;
a vibration controller for operating the actuator based on a vibration signal, which is correlated to vibrations of a second target object;
a vibration sensor embedded in the second target object for generating the vibration signal; and
a fuel injection controller;
wherein:
the actuator comprises a flexibly resilient block and an actuator unit molded within said block;
the dynamic damper is operable to attenuate vibrations from the first target object in a vehicle vertical direction based on the total mass of the dynamic damper including the mass of the actuator;
the dynamic damper is further operable to attenuate vibrations from the second target object in a vehicle front-rear direction based on movement of the actuator unit in the vehicle front-rear direction; and
the elastic members are arranged on the bracket along the vehicle front-rear direction so as to sandwich the block therebetween;
the actuator operates in the vehicle front-rear direction;
the elastic members are formed to be thinner in the vehicle vertical direction than in the vehicle front-rear direction;
the actuator and the elastic members are arranged in a substantially linear relationship;
each of the elastic members is of a flat rectangular parallelepiped shape, in which a length in a vehicle width direction is greater than a length in the vehicle front-rear direction and the length in the vehicle front-rear direction is greater than a length in the vehicle vertical direction; and
the vibration controller controls the actuator unit based on the vibration signal received from the vibration sensor and further based on an engine pulse signal received from the fuel injection controller.

2. The vehicle-mounted active vibration reducing apparatus according to claim 1, wherein the actuator unit is one of a reciprocating motor, a piezo actuator, a voice-coil actuator and a linear solenoid.

3. The vehicle according to claim 1, wherein the second target object is a steering wheel.

4. In a vehicle having a frame member and an engine operatively connected to the frame member, the improvement comprising an active vibration reducing apparatus comprising:
a dynamic damper including a metal bracket operatively attached to said frame member, said dynamic damper configured to be reciprocally movable in at least two directions, a pair of elastic members mounted on the bracket, said elastic members being thinner in a vertical direction than in a vehicle front-rear direction, and an actuator operatively supported between the elastic members, said elastic members and said actuator arranged in a substantially linear relationship in the vehicle front-rear direction;

a vibration controller for operating the actuator based on a vibration signal, which is correlated to vibrations of a target object other than the engine;

a vibration sensor embedded in the target object for generating the vibration signal; and a fuel injection controller;

wherein:

the actuator comprises a flexibly resilient block and an elongated actuator unit molded within said block and extending substantially horizontally in a front-rear direction therein;

each of the elastic members is of a flat rectangular parallelepiped shape, in which a length in a vehicle width direction is greater than a length in the vehicle front-rear direction and the length in the vehicle front-rear direction is greater than a length in the vertical direction;

the dynamic damper is operable to passively attenuate vibrations from the engine by reciprocally moving in the vertical direction based on the total mass of the dynamic damper including the mass of the actuator;

the actuator moves in the horizontal direction along a front-rear axis of the vehicle;

the dynamic damper is further operable to attenuate vibrations from the target object by reciprocally moving in the horizontal direction based on the active horizontal movement of the actuator unit in the horizontal direction in response to signals from the vibration controller; and the vibration controller controls the actuator unit based on the vibration signal received from the vibration sensor and further based on an engine pulse signal received from the fuel injection controller.

5. The active vibration reducing apparatus according to claim 4, wherein the actuator is fixed in position in the horizontal direction relative to the bracket, and is movably supported by the elastic members so as to be swingable relative to the bracket in the vertical direction.

6. The active vibration reducing apparatus according to claim 4, wherein the actuator unit is one of a reciprocating motor, a piezo actuator, a voice-coil actuator and a linear solenoid.

7. The vehicle according to claim 4, wherein the target object is a steering wheel.

8. The vehicle-mounted active vibration reducing apparatus according to claim 4, wherein:

the target object is the frame member, the vibration sensor is embedded in the frame member at a position closer to a vehicle front side than a steering wheel, such that the actuator and the vibration sensor are disposed in proximity to each other, and the vibration controller sets a simulated transfer function of a reference signal generator close to one.

* * * * *